(12) United States Patent
Yoshiuchi

(10) Patent No.: US 8,046,449 B2
(45) Date of Patent: Oct. 25, 2011

(54) CONTENTS MANAGEMENT SYSTEM AND CONTENTS MANAGEMENT METHOD

(75) Inventor: Hideya Yoshiuchi, Beijing (CN)

(73) Assignee: Hitachi, Ltd., Tokyo (JP)

( * ) Notice: Subject to any disclaimer, the term of this patent is extended or adjusted under 35 U.S.C. 154(b) by 878 days.

(21) Appl. No.: 11/958,820

(22) Filed: Dec. 18, 2007

(65) Prior Publication Data

US 2008/0201461 A1   Aug. 21, 2008

(30) Foreign Application Priority Data

Feb. 15, 2007   (CN) .......................... 2007 1 0005903

(51) Int. Cl.
*G06F 15/173* (2006.01)
(52) U.S. Cl. ....................... 709/223; 709/231
(58) Field of Classification Search .................. 709/203, 709/223, 231
See application file for complete search history.

(56) References Cited

U.S. PATENT DOCUMENTS

| 2005/0235047 | A1  | 10/2005 | Li |
| 2007/0214148 | A1* | 9/2007  | Bodin et al. ................... 707/10 |
| 2007/0294254 | A1* | 12/2007 | Yao ................................ 707/10 |
| 2008/0115167 | A1* | 5/2008  | Hermsmeyer et al. ......... 725/46 |
| 2010/0151782 | A1* | 6/2010  | Sato et al. .................... 455/3.01 |

* cited by examiner

*Primary Examiner* — Ario Etienne
*Assistant Examiner* — El Hadji Sall
(74) *Attorney, Agent, or Firm* — Mattingly & Malur, PC

(57) ABSTRACT

A system includes a contents management server that manages the locations of contents, a contents server that manages contents, a client terminal that receives or stores contents, and a network. The client terminal sends a contents sending request message to the contents management server. The contents management server, which has received the request from the client terminal, detects the network to which the client terminal belongs, instructs the contents server, which manages the network, to stream the contents. After that, the contents management server checks if there is a client terminal related to the client terminal that has sent the contents sending request. If there is a related client terminal, the contents management server instructs the contents server, which manages a network to which the related terminal belongs, to store the contents.

9 Claims, 16 Drawing Sheets

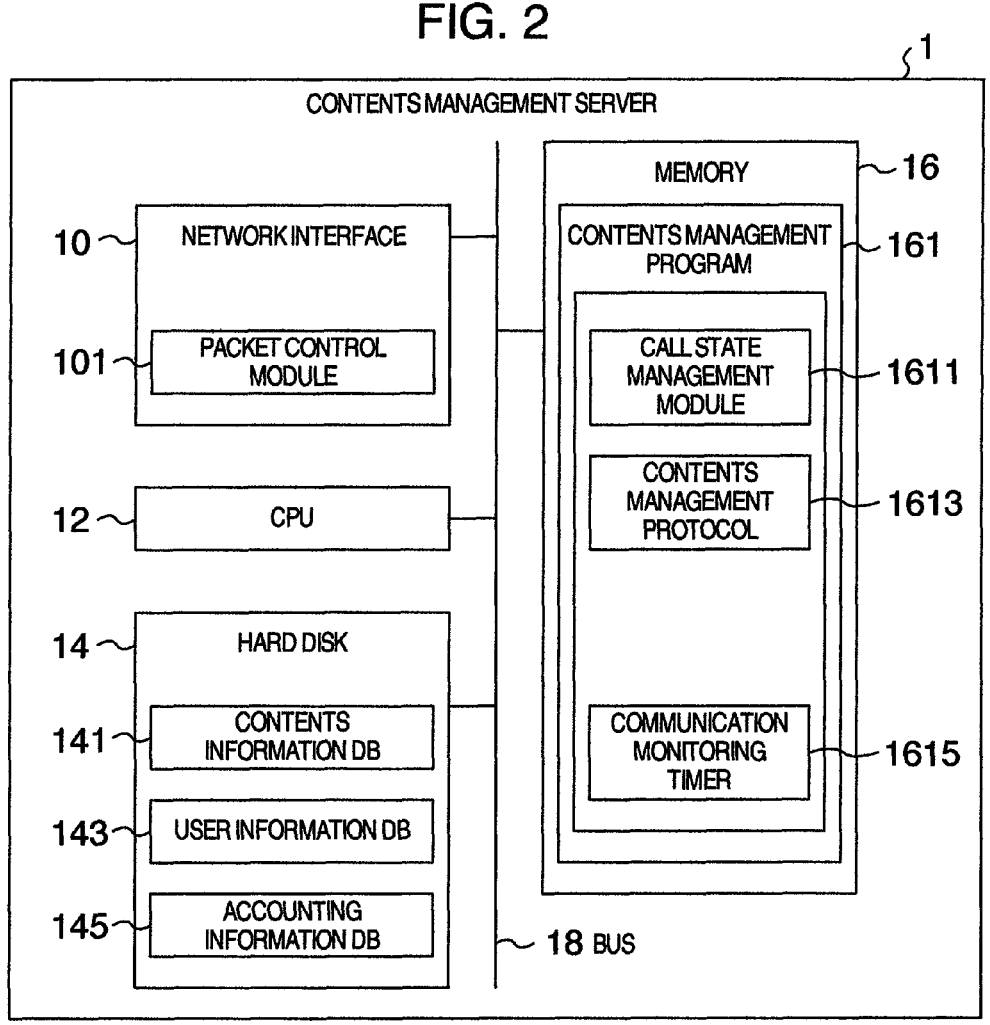

FIG. 3A

CONTENTS INFORMATION DB 141

| CONTENTS INFORMATION TABLE 1411 | | | | | |
|---|---|---|---|---|---|
| CONTENTS IDENTIFIER | CHANNEL IDENTIFIER | CONTENTS SERVER ADDRESS 1 | NETWORK IDENTIFIER 1 | ...... | CONTENTS SERVER ADDRESS N | NETWORK IDENTIFIER N |

FIG. 3B

USER INFORMATION DB 143

| USER BASIC INFORMATION TABLE 1431 | | | | | |
|---|---|---|---|---|---|
| USER IDENTIFIER | USER ACCOUNT 1 | NETWORK IDENTIFIER 1 | ...... | USER ACCOUNT N | NETWORK IDENTIFIER N |

| CLIENT RELATION INFORMATION TABLE 1433 | | | | | |
|---|---|---|---|---|---|
| USER IDENTIFIER | USER ACCOUNT 1 | RELATED CLIENT 1 | CONTENTS PROCESSING METHOD 1 | ...... | USER ACCOUNT N | RELATED CLIENT N | CONTENTS PROCESSING METHOD N |

FIG. 3C

ACCOUNTING INFORMATION DB 145

| ACCOUNTING INFORMATION TABLE 1451 | | | | | | | | | |
|---|---|---|---|---|---|---|---|---|---|
| CONTENTS IDENTIFIER | CHANNEL IDENTIFIER | USER IDENTIFIER | USER ACCOUNT 1 | ACCOUNTING START TIME 1 | ACCOUNTING END TIME 1 | ACCOUNTING METHOD 1 | USER ACCOUNT 2 | ACCOUNTING START TIME 2 | ACCOUNTING END TIME 2 | ACCOUNTING METHOD 2 | ...... |

FIG. 4B

CONTENTS INFORMATION DB 241

| CONTENTS INFORMATION TABLE 2411 | | |
|---|---|---|
| CONTENTS IDENTIFIER | CHANNEL IDENTIFIER | CONTENTS |

FIG. 4C

USER INFORMATION DB 243

| USER INFORMATION TABLE 2431 | | |
|---|---|---|
| USER ACCOUNT | CLIENT ADDRESS | CHANNEL IDENTIFIER LIST |

FIG. 4D

ACCOUNTING INFORMATION DB 245

| ACCOUNTING INFORMATION TABLE 2451 | | | | | |
|---|---|---|---|---|---|
| CONTENTS IDENTIFIER | CHANNEL IDENTIFIER | USER ACCOUNT | ACCOUNTING START TIME | ACCOUNTING END TIME | ACCOUNTING METHOD |

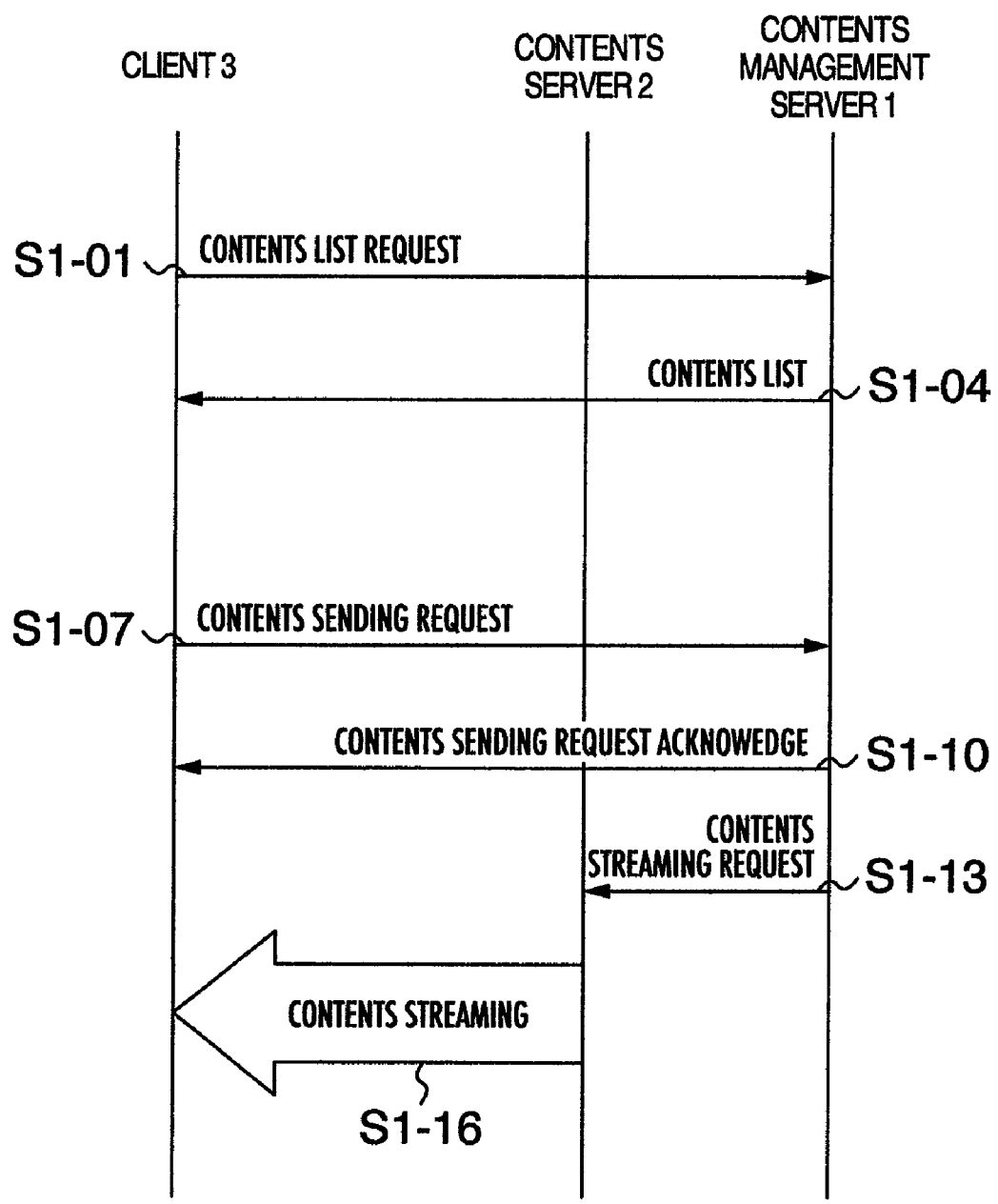

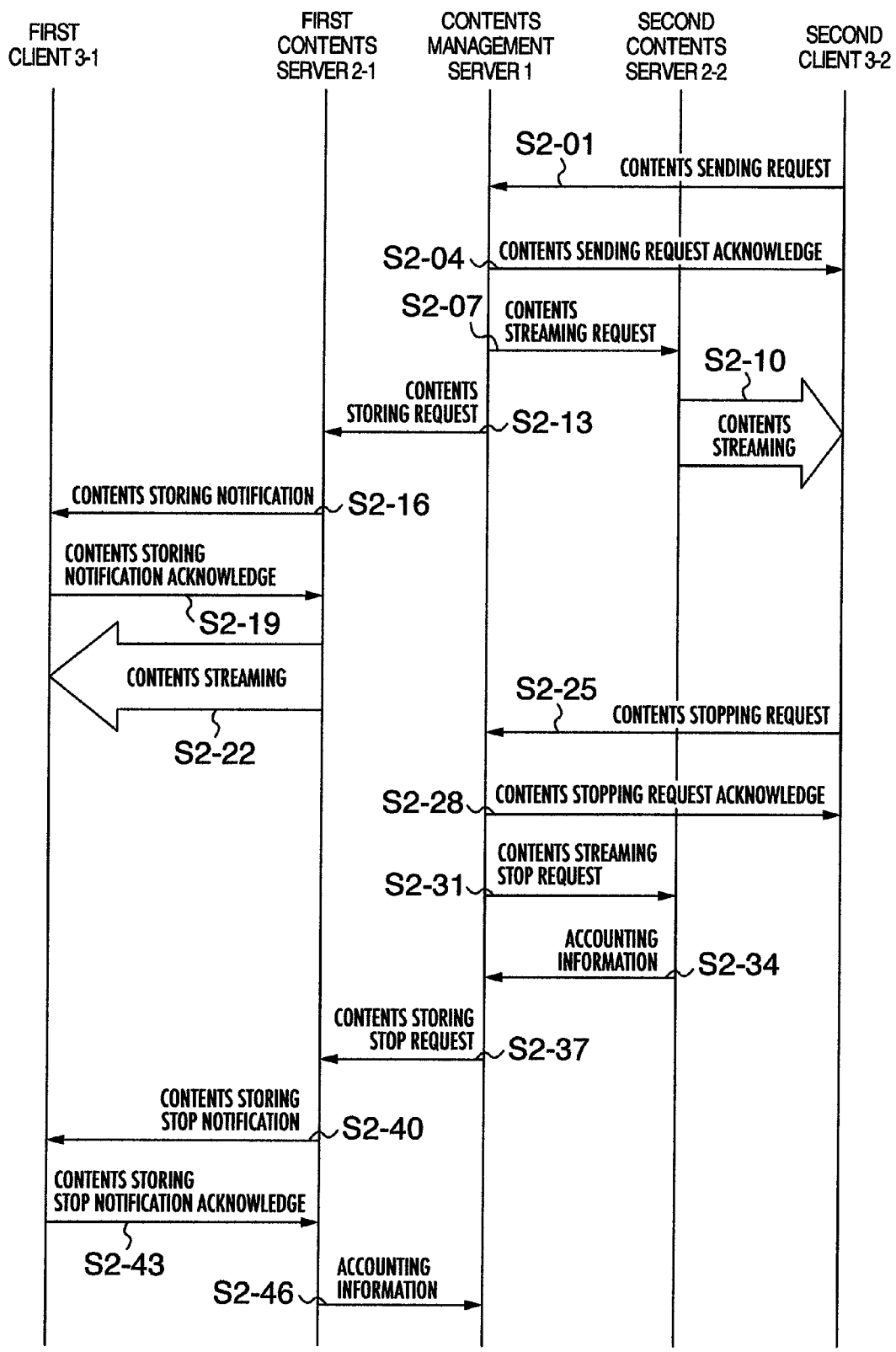

FIG. 14

PF-01: | SOURCE ADDRESS | DESTINATION ADDRESS | PACKET TYPE (CONTENTS LIST REQUEST) | USER ACCOUNT |

PF-02: | SOURCE ADDRESS | DESTINATION ADDRESS | PACKET TYPE (CONTENTS LIST) | CONTENTS IDENTIFIER LIST | CHANNEL IDENTIFIER LIST |

PF-03: | SOURCE ADDRESS | DESTINATION ADDRESS | PACKET TYPE (CONTENTS SENDING REQUEST) | CONTENTS IDENTIFIER | CHANNEL IDENTIFIER | USER ACCOUNT | NETWORK IDENTIFIER |

PF-04: | SOURCE ADDRESS | DESTINATION ADDRESS | PACKET TYPE (CONTENTS SENDING REQUEST ACKNOWLEDGE) | CONTENTS IDENTIFIER | CHANNEL IDENTIFIER | USER ACCOUNT | RESPONSE CODE |

PF-05: | SOURCE ADDRESS | DESTINATION ADDRESS | PACKET TYPE (CONTENTS STREAMING REQUEST) | CONTENTS IDENTIFIER | CHANNEL IDENTIFIER | USER ACCOUNT |

PF-06: | SOURCE ADDRESS | DESTINATION ADDRESS | PACKET TYPE (CONTENTS STORING REQUEST) | CONTENTS IDENTIFIER | CHANNEL IDENTIFIER | USER ACCOUNT | CONTENTS PROCESSING METHOD |

PF-07: | SOURCE ADDRESS | DESTINATION ADDRESS | PACKET TYPE (CONTENTS STORING NOTIFICATION) | CONTENTS IDENTIFIER | CHANNEL IDENTIFIER | USER ACCOUNT |

PF-08: | SOURCE ADDRESS | DESTINATION ADDRESS | PACKET TYPE (CONTENTS STORING NOTIFICATION ACKNOWLEDGE) | CONTENTS IDENTIFIER | CHANNEL IDENTIFIER | USER ACCOUNT | RESPONSE CODE |

FIG. 15

| | Source Address | Destination Address | Packet Type | Contents Identifier | Channel Identifier | User Account | | | |
|---|---|---|---|---|---|---|---|---|---|
| PF-09 | SOURCE ADDRESS | DESTINATION ADDRESS | PACKET TYPE (CONTENTS STOPPING REQUEST) | CONTENTS IDENTIFIER | CHANNEL IDENTIFIER | USER ACCOUNT | NETWORK IDENTIFIER | | |
| PF-10 | SOURCE ADDRESS | DESTINATION ADDRESS | PACKET TYPE (CONTENTS STOPPING REQUEST ACKNOWLEDGE) | CONTENTS IDENTIFIER | CHANNEL IDENTIFIER | USER ACCOUNT | RESPONSE CODE | | |
| PF-11 | SOURCE ADDRESS | DESTINATION ADDRESS | PACKET TYPE (CONTENTS STREAMING STOP REQUEST) | CONTENTS IDENTIFIER | CHANNEL IDENTIFIER | USER ACCOUNT | | | |
| PF-12 | SOURCE ADDRESS | DESTINATION ADDRESS | PACKET TYPE (CONTENTS TEMPORARY STORING NOTIFICATION) | CONTENTS IDENTIFIER | CHANNEL IDENTIFIER | USER ACCOUNT | | | |
| PF-13 | SOURCE ADDRESS | DESTINATION ADDRESS | PACKET TYPE (CONTENTS TEMPORARY STORING NOTIFICATION ACKNOWLEDGE) | CONTENTS IDENTIFIER | CHANNEL IDENTIFIER | USER ACCOUNT | RESPONSE CODE | | |
| PF-14 | SOURCE ADDRESS | DESTINATION ADDRESS | PACKET TYPE (CONTENTS STORING STOP REQUEST) | CONTENTS IDENTIFIER | CHANNEL IDENTIFIER | USER ACCOUNT | | | |
| PF-15 | SOURCE ADDRESS | DESTINATION ADDRESS | PACKET TYPE (CONTENTS STORING STOP NOTIFICATION) | CONTENTS IDENTIFIER | CHANNEL IDENTIFIER | USER ACCOUNT | | | |
| PF-16 | SOURCE ADDRESS | DESTINATION ADDRESS | PACKET TYPE (CONTENTS STORING STOP NOTIFICATION ACKNOWLEDGE) | CONTENTS IDENTIFIER | CHANNEL IDENTIFIER | USER ACCOUNT | RESPONSE CODE | | |
| PF-17 | SOURCE ADDRESS | DESTINATION ADDRESS | PACKET TYPE (ACCOUNTING INFORMATION) | CONTENTS IDENTIFIER | CHANNEL IDENTIFIER | USER ACCOUNT | ACCOUNTING START TIME | ACCOUNTING END TIME | ACCOUNTING METHOD |

CONTENTS MANAGEMENT SYSTEM AND CONTENTS MANAGEMENT METHOD

INCORPORATION BY REFERENCE

The present application claims priority from Chinese application P200710005903.9 filed on Feb. 15, 2007, the content of which is hereby incorporated by reference into this application.

BACKGROUND OF THE INVENTION

1. Field of the Invention

The present invention relates to an improvement in a broadcast service system that manages the contents in multiple networks.

2. Description of Related Art

An advance in the access network technology, such as a fiber optic network connection running to a node located inside an individual home (FTTH), makes a broader frequency band available for use by a user. A broader frequency band allows the broadband contents transmission service to be made available on a network and gradually expands the market of the video-oriented services such as the Internet Protocol Television (IPTV) service and the Video on Demand (VoD) service. The requirements for the contents transmission service include not only broadband capability and high-quality contents but also the contents sending function and the contents storing function in the distributed network environment. For example, US 2005/0235047 A1 (Li et. al.), one of prior art technologies, proposes the following function. In a multimedia streaming service where multiple streaming servers are provided, each streaming server manages information on the related streaming server group. When a streaming acquisition request is received from a user, this multimedia streaming service searches for a streaming server that will perform the most appropriate processing for the request and provides the user with data from that streaming server. Alternatively, a streaming server that receives the request from the user downloads data from the streaming server that will perform the most appropriate processing for the request while performing high-speed buffering as required. The prior art technology described above, which allows multiple streaming servers to work together, reduces the system load and optimizes the frequency band utilization.

The problem with the prior art described above is that all streaming servers must be connected to the common network. Because no consideration is made for the relation between streaming servers connected to different networks such as a fixed access network and a mobile communication network, the proposed function is not applicable to a contents transmission service between networks where there is a significant difference in the frequency band.

SUMMARY OF THE INVENTION

In view of the foregoing, it is an object of the present invention to provide a device that integrally manages contents for multiple networks to allow a user to acquire the contents, most suitable for the status of the network, without worrying about the status of the network to which the user belongs and the frequency band of the contents. It is also an object of the present invention to provide a service for automatically storing the contents, which the user is currently viewing, on another terminal of the user.

The present invention implements the contents streaming service that provides the same contents on multiple different networks in a form suitable for each network and the service that has the following function. A contents management server is provided that manages contents with relations assigned to the contents stored on multiple networks. When a user on a network requests the streaming of contents, the contents management server that has received the request instructs the contents server of the network to which the user belongs to provide the contents in a form suitable for the network. In addition, another network client terminal of the user automatically stores the related contents as necessary.

Other objects, features and advantages of the invention will become apparent from the following description of the embodiments of the invention taken in conjunction with the accompanying drawings.

BRIEF DESCRIPTION OF THE DRAWINGS

FIG. 2 is a block diagram showing the configuration of a contents management server.

FIG. 3A is a block diagram showing the configuration of a contents information database of the contents management server.

FIG. 3B is a block diagram showing the configuration of a user information database of the contents management server.

FIG. 3C is a block diagram showing the configuration of an accounting information database of the contents management server.

FIG. 4B is a block diagram showing the configuration of a contents information database of the contents server.

FIG. 4C is a block diagram showing the configuration of a user information database of the contents server.

FIG. 4D is a block diagram showing the configuration of an accounting information database of the contents server.

FIG. 6 is a timing diagram showing the processing when the client terminal acquires contents.

FIG. 7 is a timing diagram showing the processing when the client terminal acquires contents and the contents, from the time the user starts viewing to the time the user stops viewing, are stored on another client terminal.

FIG. 14 is a diagram showing an example of packet formats used in the contents management system.

FIG. 15 is a diagram showing an example of packet formats used in the contents management system.

DETAILED DESCRIPTION OF THE EMBODIMENTS

Figure 1:
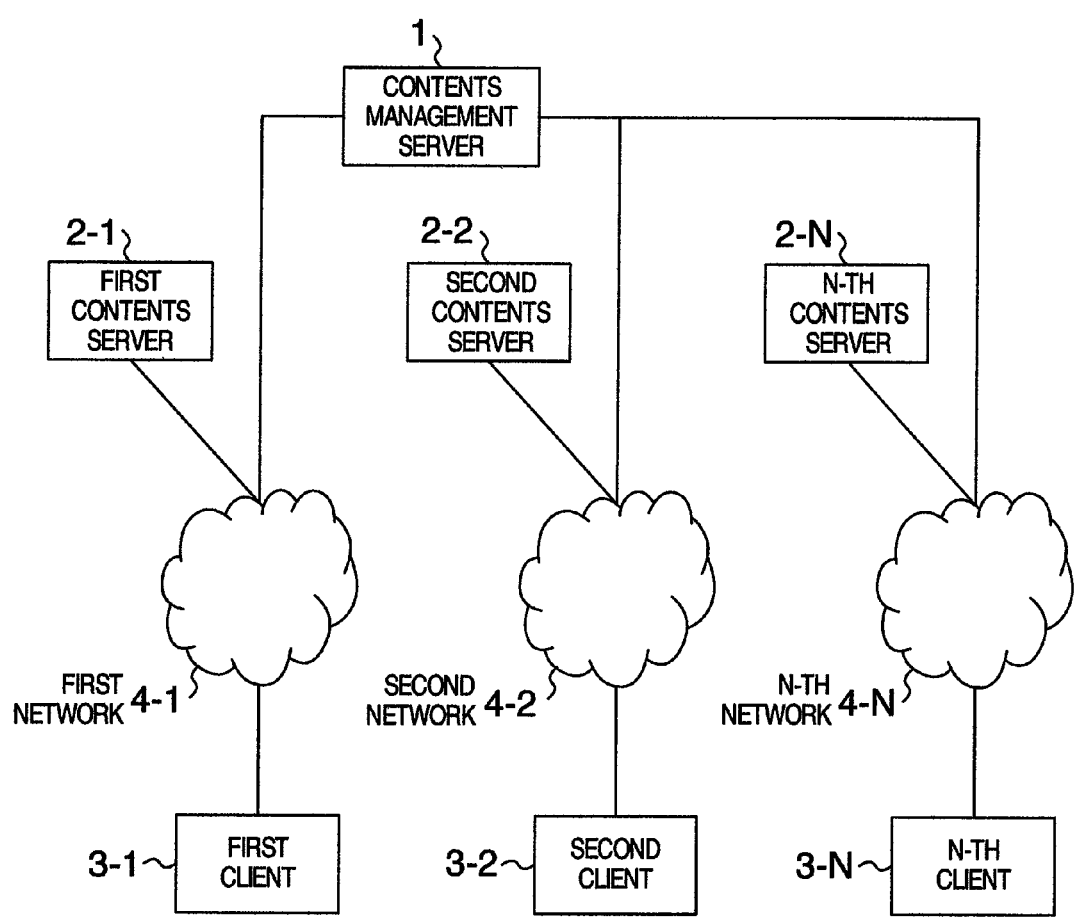
FIG. 1 is a block diagram showing a contents management system in one embodiment of the present invention.

The following describes one embodiment of the present invention with reference to the drawings. FIG. 1 is a diagram showing the configuration of a contents management system that is an example in which the present invention is applied. The contents management system, connected to multiple networks 4-1 to 4-N, includes a contents management server 1 that integrally manages contents information on all networks and contents servers 2-1 to 2-N that provide the contents broadcast service to client terminals 3-1 to 3-N in response to a request from the user. The networks 4-1 to 4-N may have different characteristics; for example, the network 4-1 is a broadband optical network, the network 4-2 is a wireless mobile communication network of mobile phones, and so on. Each network has a contents server, 2-1 to 2-N, for providing contents in the optimum format on the network. The parameters that specify the characteristics of contents are the contents encryption method, the bit rate, the image size, and so on. Each of the client terminals 3-1 to 3-N requests the contents management server 1 to send contents, and the contents management server instructs the contents server, which is present on the network to which the client terminal belongs, to send the contents. The sequence of operations will be described later. In the figures, the client terminal is abbreviated to client.

The following describes the devices more in detail. FIG. 2 is a diagram showing the configuration of the contents management server 1. The contents management server 1 comprises a CPU 12, a memory 16, a hard disk 14, and a network interface 10, all of which are connected to a bus 18, and communicates with a network 4 (4-1 to 4-N) via a packet control module 101 of the network interface 10. The hard disk 14 includes a contents information database (DB) 141 in which information on the contents present on the multiple networks is stored, a user information DB 143 in which basic information on all networks related to users is stored, and an accounting information DB 145 in which accounting information is stored. A contents management program 161 installed in the memory 16 reads information from, and writes information to, the hard disk 14.

The contents management program 161 in the memory 16 comprises a call state management module 1611 that manages session states and controls the contents servers 2-1 to 2-N as described above according to a contents management protocol 1613. The contents management program 161 also monitors a communication session between the contents management server 1 and the contents servers 2-1 to 2-N via a communication monitoring timer 1615 to detect an error.

FIGS. 3A, 3B, and 3C are diagrams showing the data configuration of the contents information DB 141, user information DB 143, and accounting information DB 145, respectively. The contents information DB 141 shown in FIG. 3A includes a contents information table 1411. Each record in the contents information table 1411 includes a contents identifier and a channel identifier that uniquely identify broadcast service contents on the multiple networks, a contents server address that is the address of the contents server 2 present on each network, and a network identifier that uniquely identifies each network. The channel identifier uniquely identifies a broadcast channel, and the contents identifier identifies the contents on the channel. Because each record stores a set of addresses of the content servers 2 (2-1 to 2-N) of the networks that are available for use, the relation of the contents can be managed. When a user views contents on a network, this relation information is used to detect a contents server on other networks.

The user information DB 143 shown in FIG. 3B includes a user basic information table 1431 and a client relation information table 1433. The user basic information table 1431 is a table that manages a set of account information that the user has on the networks. Each record stores a user identifier that uniquely identifies the user and a user account used on one network and the network identifier that uniquely identifies that network. The network identifier, which is an identifier that indicates the characteristics of a network, includes information on the network type, such as an IP(Internet Protocol) network, mobile network, and so on, as well as an identifier that can uniquely identify a service provider. For example, the network identifier includes the name of a service provider on the Internet or a mobile network. To receive services on a network, a user account corresponding to the network is necessary. When the user has N accounts corresponding to network 1 to network N, each record integrally manages the correspondence between N user accounts and N network identifiers.

The client relation information table 1433 manages information that establishes the relation between a user's account on each network and an account on another network and specifies an operation to be performed on a client terminal present on the other network. Each record stores a user identifier, a user account used on one network, a related client terminal corresponding to the account, and a contents processing method for the related client terminal. The contents processing method, which is a contents storing method, specifies the function to store the contents, viewed on one client terminal, into another client terminal based on a user-specified condition. The condition specification method will be described later.

The accounting information DB 145 shown in FIG. 3C includes an accounting information table 1451. The accounting information table 1451 manages accounting information on contents viewing. Each record includes a contents identifier that uniquely indicates contents, a channel identifier that uniquely indicates the broadcast channel of the contents, a user identifier that uniquely indicates a user, a user account corresponding to one network, an accounting start time that is a time when the user views the contents using the user account, an accounting end time, and an accounting method. There is a case in which a set of multiple accounting start times, accounting end times, and accounting methods are stored. For example, when the user views the first half of contents when the user is away from home on the first network (mobile phone network) and the second half on the second network (home), multiple pieces of accounting information, corresponding to the first network and the second network, are related to the same contents identifier and the same user identifier. The accounting method differs according to the contents processing method. For example, the accounting method is used to distinguish between a case in which the user views the contents directly and a case in which the user temporarily stores the contents and views them later.

Figure 4A:
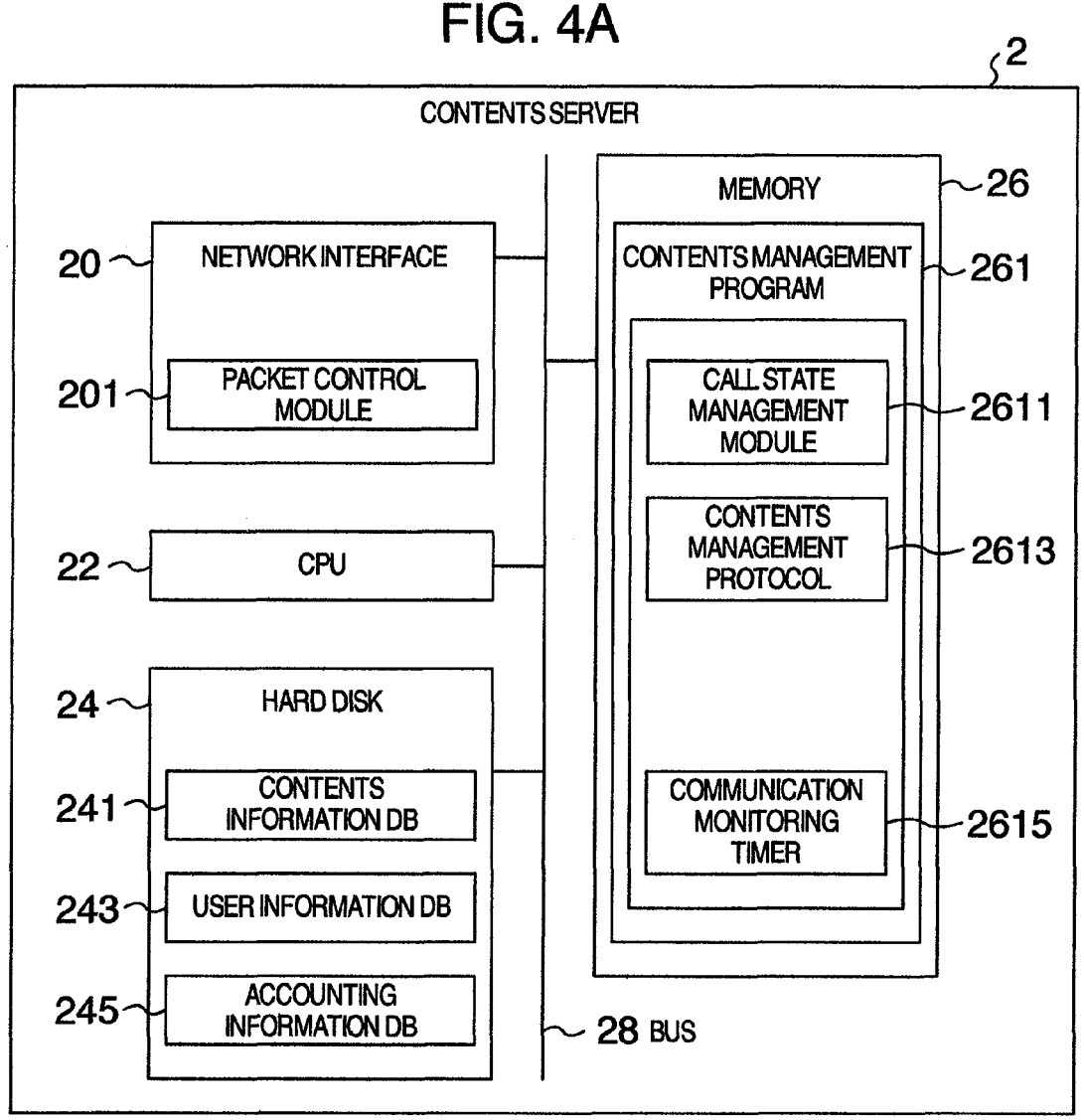
FIG. 4A is a block diagram showing the configuration of a contents server.

FIG. 4A is a diagram showing the device configuration of the contents server 2. The contents server 2, which has a CPU 22, a memory 26, a hard disk 24, and a network interface 20, all of which are connected to a bus 28, communicates with the network 4 via a packet control module 201 included in the network interface 20. The hard disk 24 stores contents information DB 241, in which information related to the contents on the network to which the contents server 2 belongs is stored, and a user information DB 243 in which basic information on the users of the network is stored, and an accounting information DB 245 in which accounting information is stored. A contents management program 261 installed in the memory 26 is used to read information from, or written information to, the hard disk 24.

The contents management program 261 in the memory 26 includes a call state management module 2611 that manages the session states, communicates with the contents management server 1 or controls the client terminal 3 (3-1 to 3-N) via a contents management protocol 2613, and monitors the communication session of the contents server 2 with the contents management server 1 and with client terminal 3 via a communication monitor self timer 2615 to detect an error in the session.

The following describes information managed by each database. The contents information DB 241 shown in FIG. 4B includes a contents information table 2411. Each record in the contents information table 2411 includes a contents identifier that uniquely identifies contents and a channel identifier that uniquely identifies a broadcast channel. The user specifies a broadcast channel to receive contents that are provided by the broadcast service. In the broadcast service, too, the user cannot view specific contents from the beginning at any time he or she wants, but the user is required to select contents from a predetermined broadcast program provided by the service provider. To select contents, a channel identifier is used. Multiple contents having the same channel identifier are broadcast in order of time based on the broadcast program.

The user information DB 243 shown in FIG. 4C includes a user information table 2431. The user information table 2431 manages information on the users of the network managed by the contents server 2. Each record stores a user account, the address of the client terminal of the user, and a list of channel identifiers available to the user for viewing.

The accounting information DB 245 shown in FIG. 4D includes an accounting information table 2451. The accounting information table 2451 manages the accounting information on contents viewing. Each record stores a contents identifier that uniquely indicates contents, a channel identifier that uniquely identifies a broadcast channel, a user account, an accounting start time, an accounting end time, and an accounting method. The data type of the accounting method is the same as that in the accounting information table 1451 of the contents management server 1.

Figure 5A:
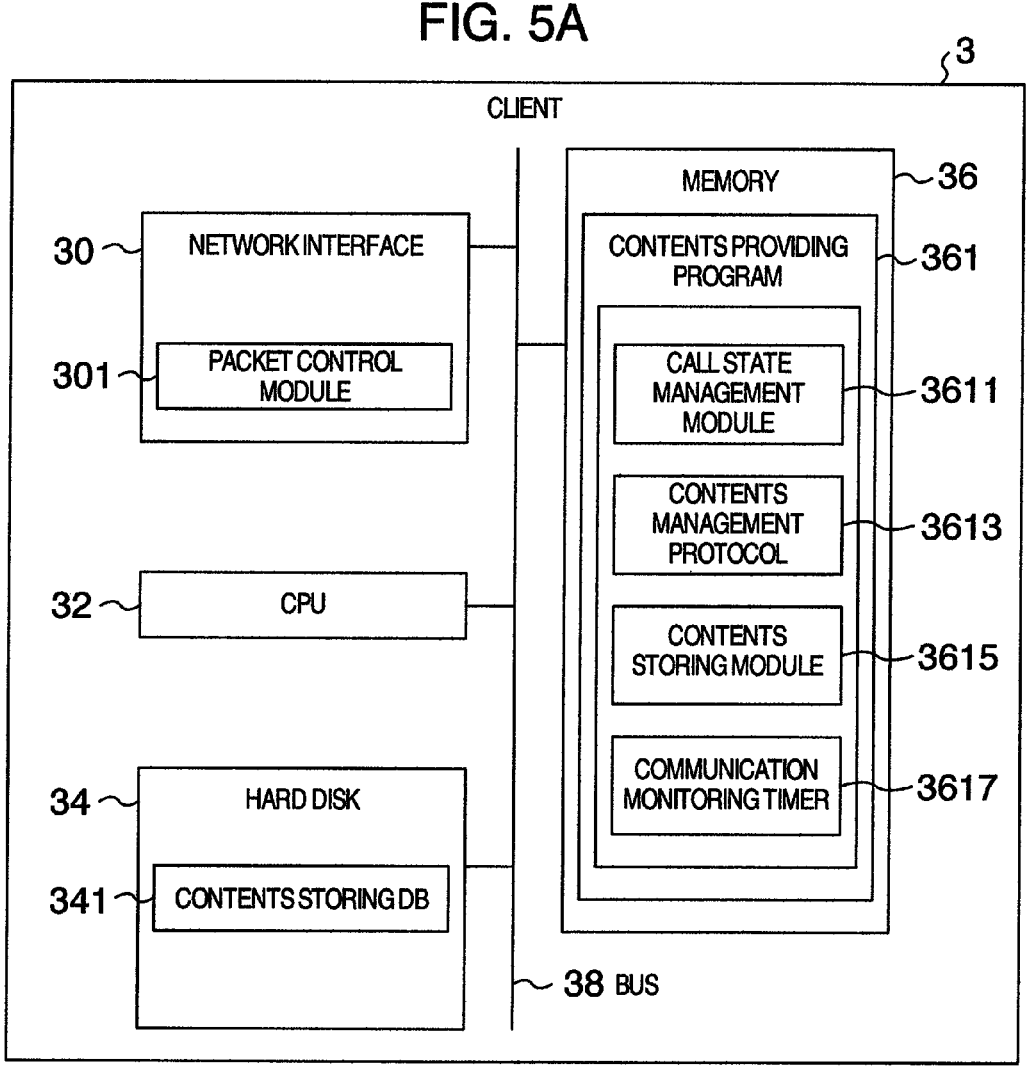
FIG. 5A is a block diagram showing the configuration of a client terminal.

FIG. 5A is a diagram showing the device configuration of the client terminal 3. The client terminal 3 comprises a CPU 32, a memory 36, a hard disk 34, and a network interface 30, all of which are connected to a bus 38, and communicates with the network 4 via a packet control module 301 of the network interface 30. The hard disk 34 includes a contents storing DB 341 in which contents are stored based on the instruction from the contents server 2. A contents providing program 361 installed in the memory 36 reads information from, and writes information to, the hard disk 34.

Figure 5B:
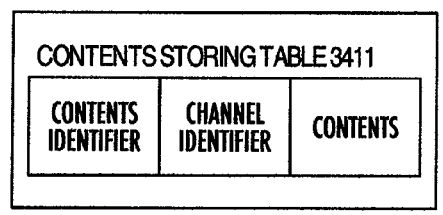
FIG. 5B is a block diagram showing the configuration of a contents storing database of the client terminal.

The contents providing program 361 stored in the memory 36 comprises a call state management module 3611 that manages session states, communicates with the contents management server 1 and the contents server 2 via a contents management protocol 3613, and monitors a communication session between the contents servers 2 and the contents management server 1 via a communication monitoring timer 3617 to detect an error. The contents providing program 361 further comprises a contents storing module 3615 that stores contents based on an instruction from the contents server. The contents storing DB 341 shown in FIG. 5B includes a contents storing table 3411. Each record in the contents storing table 3411 stores a contents identifier that uniquely identifies contents, a channel identifier that identifies a contents broadcast channel, and contents. The stored contents can be viewed any time in response to a request from the user.

Next, the following describes the general operation of the contents management system, disclosed by the present invention, with reference to the timing diagrams shown in the figures.

First, the basic operation for viewing contents on the client terminal 3 via the contents management server 1 will be described with reference to FIG. 6. To view contents, the client terminal 3 first sends a contents list request to the contents management server 1 (S1-01). The client terminal 3 sends a contents list request message to the contents management server. FIG. 14 shows examples of packet formats, PF-01 to PF-08, sent and received in this system. The contents list request message PF-01 (FIG. 14) includes a source address, a destination address, a packet type, and a user account. The packet stores the address of the client terminal 3 as the source address, and the address of the contents management server 1 as the destination address. In response to the contents list request message, the contents management server 1 searches the user basic information table 1431 with the user account as the key to determine if the user may acquire the contents list. If the user may acquire the contents list, the contents management server 1 sends the contents list to the client terminal 3 (S1-04).

The contents list PF-02 (FIG. 14) includes a source address, a destination address, a packet type, a contents identifier list, and a channel identifier list. The user who has received the contents list sends a contents sending request message to the contents management server 1 with the contents, which the user wants to view, specified from the list (S1-07). The contents sending request message PF-03 (FIG. 14) includes a source address, a destination address, a packet type, a contents identifier, a channel identifier, a user account, and a network identifier. The network identifier is an identifier that uniquely identifies a network. The contents identifier and the channel identifier specify the broadcast channel and the contents that the user wants to view. In response to the contents sending request message, the contents management server 1 returns a contents sending request acknowledge message to the client terminal 3 (S1-10).

The contents sending request acknowledge message PF-04 (FIG. 14) includes a source address, a destination address, a packet type, a contents identifier, a channel identifier, a user account, and a response code. The response code is an identifier that indicates whether or not the processing is terminated successfully. Next, from the user account and the network identifier included in the contents sending request message received in step S1-07, the contents management server 1 extracts the name of the user who requested the contents and the network to which the client terminal belongs. After that, the contents management server 1 searches the contents information table 1411 with the network identifier as the search key to acquire the address of the contents server 2 that will provide the contents to the user. The contents management server 1, which has acquired all information required for streaming the contents, sends a contents streaming request message to the contents server 2 acquired in the above step (S1-13). The contents streaming request message PF-05 (FIG. 14) includes a source address, a destination address, a packet type, a contents identifier, a channel identifier, and a user account. The contents server 2, which has received the contents streaming request message, finds which user wants to view which contents and sends the contents to the client terminal 3 of the user (S1-16).

Next, the following describes the operation that is performed when a related client terminal (second client terminal) and a contents processing method are specified for a client terminal (first client terminal). An example of such an operation is that the user has a contents viewing environment at home and, when the user is in transit, the user views contents using a client terminal such as a mobile phone. A user of the broadcast service can view a program (contents) not only from its start but also from an intermediate point in many cases. In addition, the user who is in transit views a program not only to the end of the program but also from one intermediate point to another intermediate point of the program in many cases. In such a case, even if the user stops viewing the program when the user is in transit, the user can store the subsequent part of the program in the client terminal at home so that the user can view the program in its entirety. The processing described above is performed in one of the following situations.

(1) The user stores the contents, from the time the user starts viewing to the time the user stops viewing, on the other client terminal (processing method 1).

(2) The user stores the contents, from the time the user starts viewing to the end of the contents, on the other terminal (processing method 2).

(3) The user stores the contents, from the time the user stops viewing to the end of the contents, on the other terminal (processing method 3).

(4) The user stores all contents on the other terminal when the user views the contents (processing method 4).

This processing is specified by the contents processing method field of the client relation information table 1433 (FIG. 3B) stored in the contents management server 1. The following describes the processing in detail with reference to the timing diagram.

FIG. 7 is a timing diagram showing the processing in which contents from the time the user starts viewing to the time the user stops viewing are stored on the other terminal. For simplicity, assume that the user has a first client terminal 3-1 and a second client terminal 3-2 and that the contents viewed on the second client terminal 3-2 are stored on the first client terminal 3-1. On the second client terminal 3-2, the user requests the contents management server to start providing the contents for viewing. Steps S2-01 to S2-10 in FIG. 7 are the same as steps S1-07 to S1-16 in FIG. 6. The contents management server 1, which has received a contents sending request from the second client terminal 3-2 in step S2-01, streams contents to the second client terminal 3-2 in step S2-10. In parallel with this processing, the contents management server 1 searches the client relation information table 1433 with the user account, included in the contents streaming request PF-05, as the key. In this processing, the first client terminal is related to the second client terminal 2 by the related client terminal field and, for the contents processing method, the "the user stores the contents, from the time the user starts viewing to the time the user stops viewing, on the other client terminal" is specified by the contents processing method field.

To perform the specified contents processing, the contents management server 1 must determine the contents server that manages the network to which the user account 1 belongs. The contents management server 1 searches the user basic information table 1431 with the user account as the key to acquire the network identifier of the network to which the user account belongs. After that, the contents management server 1 searches the contents information table 1411 with the acquired network identifier as the key to acquire the address of the first contents server 2-1. The contents management server 1 sends a contents storing request message to the first contents server 2-1 acquired through the sequence of search operations described above (S2-13). FIG. 14 shows the content of a contents storing request message. The contents storing request message PF-06 includes a source address, a destination address, a packet type, a contents identifier, a channel identifier, a user account, and a contents processing method. One of the contents processing methods 1-4 described above is specified for the contents processing method.

Assume that processing method 1 is specified in the processing described above. The first contents server 2-1, which has received the contents storing request message, receives information on the user who has requested to store the contents and what contents the user wants to store, and searches the user information table 2431 for the address of the client terminal with the user account as the key. Next, the first contents server 2-1 sends the contents storing notification message to the address of the first client terminal 3-1 that has been acquired (S2-16) and instructs the first client terminal 3-1 to store the contents specified in the message. The contents storing message notification message PF-07 (FIG. 14) includes a source address, a destination address, a packet type, a contents identifier, a channel identifier, and a user account. The first client terminal 3-1, which has received the contents storing notification message, sends the contents storing notification acknowledge message to the first contents server 2-1 in step S2-19 to notify whether or not the processing can be performed.

The contents storing notification acknowledge message PF-08 (FIG. 14) includes a source address, a destination address, a packet type, a contents identifier, a channel identifier, a user account, and a response code. The response code is a code indicating whether or not the processing can be performed. The first contents server 2-1, which has received the contents storing notification acknowledge message from the first client terminal 3-1, checks the response code. If the result is successful, the first contents server 2-1 starts streaming the contents (S2-22). Upon receiving the contents, the first client terminal 3-1 starts storing the contents.

Next, the following describes the processing for stopping the storing of the contents. To stop the storing of the contents, the contents stopping request message is first sent from the second client terminal 3-2, on which the user is viewing the contents, to the contents management server 1 (S2-25). FIG. 15 shows examples of the packet formats, PF-09 to PF-17, sent and received in this system. The contents stopping request message PF-09 (FIG. 15), a request message used to stop the streaming of contents that was started by the contents sending request message, includes a source address, a destination address, a packet type, a contents identifier, a channel identifier, a user account, and a network identifier. The contents management server 1, which has received the contents stopping request message, returns the contents stopping request acknowledge message to the second client terminal 3-2 (S2-28).

The contents stopping request acknowledge message PF-10 (FIG. 15) includes a source address, a destination address, a packet type, a contents identifier, a channel identifier, a user account, and a response code. The response code indicates whether or not the contents stopping processing is terminated successfully. The contents management server performs the same search processing as that in step S1-13 to send the contents streaming stop request message to the second contents server 2-2 (S2-31). The contents streaming stop request message PF-11 (FIG. 15) includes a source address, a destination address, a packet type, a contents identifier, a channel identifier, and a user account. This message specifies the contents identifier and the channel identifier to identify the contents to be stopped and the broadcast channel via which the contents to be stopped are streamed. The second contents server 2-2, which has received the contents streaming stop request message, stops the streaming of contents to the second client terminal 3-2 and sends the accounting information message to the contents management server 1 (S2-34).

The accounting information message PF-17 (FIG. 15) includes a source address, a destination address, a packet type, a contents identifier, a channel identifier, a user account, an accounting start time, an accounting end time, and an accounting method. "View" is specified for the accounting method. The data is stored in the accounting information DB 145. After sending the contents streaming stop request message, the contents management server 1 performs the search processing in the same way as when the contents management server 1 received the contents sending request message in step S2-01 in order to acquire the network to which the first client terminal 3-1 related to the second client terminal 3-2 belongs, the address of the first contents server 2-1 that manages the network, and the contents processing method for the related client terminal. Because the contents processing method for the related client terminal is "the user stores the contents, from the time the user starts viewing to the time the user stops viewing, on the other client terminal", the contents management server 1 sends the contents storing stop request message to the first contents server 2-1 (S2-37).

The contents storing stop request message PF-14 (FIG. 15) includes a source address, a destination address, a packet type, a contents identifier, a channel identifier, and a user account. The first contents server 2-1, which has received the contents storing stop request message, sends the contents storing stop notification message to the first client terminal 3-1 corresponding to the user account specified by the contents storing stop request message (S2-40). The contents storing stop notification message PF-15 (FIG. 15) is the same as the contents storing stop request message except the packet type. The first client terminal 3-1, which has received the contents storing stop notification message, stops the contents storing processing started in step S2-22 and returns the contents storing stop notification acknowledge message to the first contents server 2-1 (S2-43).

The contents storing stop notification acknowledge message PF-16 (FIG. 15) includes a source address, a destination address, a packet type, a contents identifier, a channel identifier, a user account, and a response code. The response code indicates whether or not the processing is terminated successfully. If the contents storing stop notification acknowledge message is received from the first client terminal 3-1 and the response code indicates "successful processing", the first contents server 2-1 sends the accounting information message to the contents management server 1 (S2-46). "Store" is specified for the accounting method in the accounting information message. The contents management server 1 relates the accounting information, received in step S2-34, to the accounting information, received in step S2-46, as the accounting information having the same contents identifier and manages the information as a single record in the accounting information DB 145. The processing described above completes the contents viewing processing and the contents storing processing.

Figure 8:
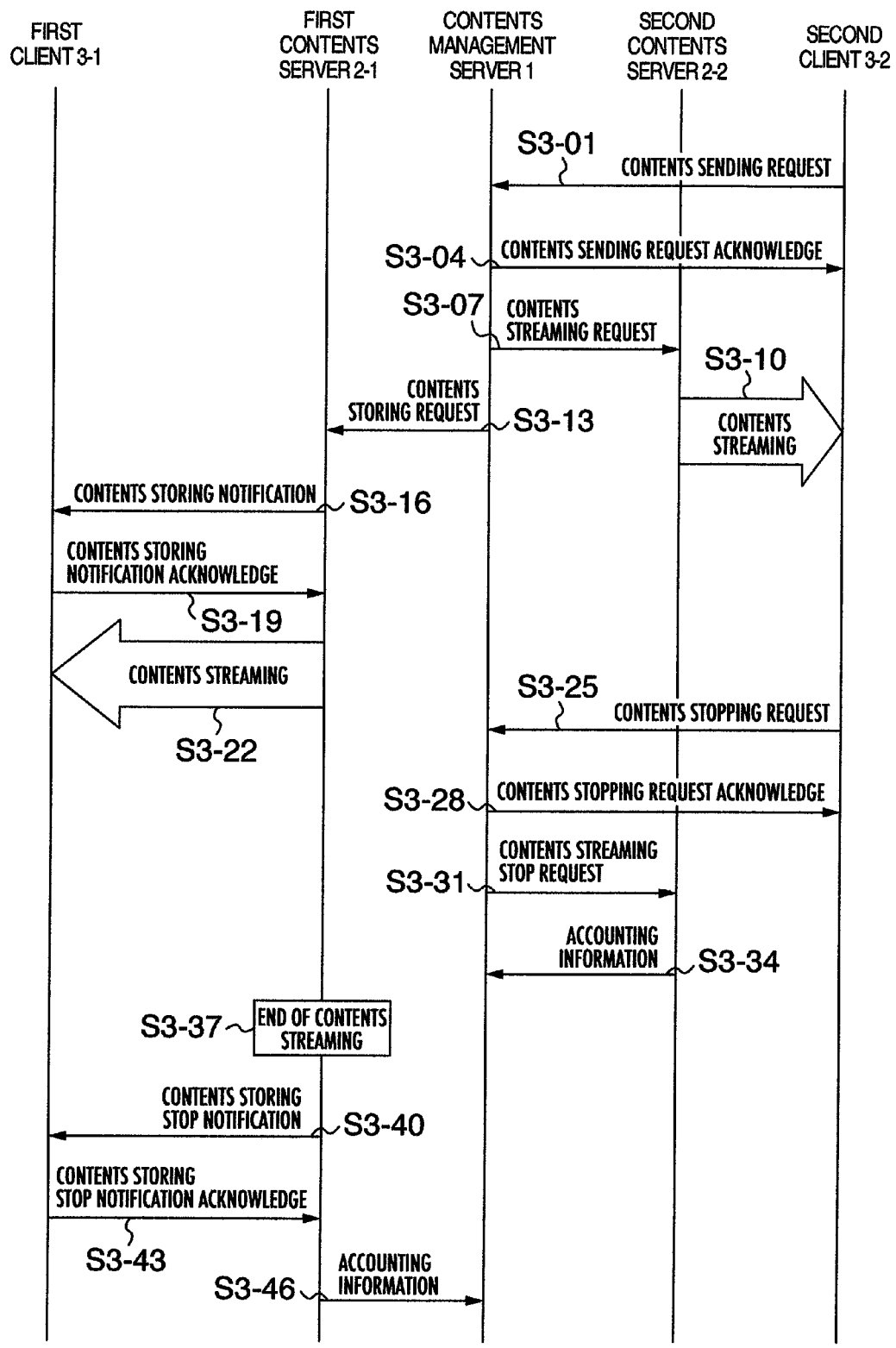
FIG. 8 is a timing diagram showing the processing when the client terminal acquires contents and the contents, from the time the user starts viewing to the end of contents streaming, are stored on another terminal.

Next, the following describes a case (processing method 2) in which the user stores the contents, from the time the user starts viewing to the end of the contents, on the other terminal with reference to FIG. 8. Because this processing method differs from processing method 1 in the data storing time, the processing in which the user starts viewing the contents on the second client terminal 3-2 to the time the storing of the contents on the first client terminal 3-1 is started (steps S3-01 to S3-22) is the same as the processing in steps S2-01 to S2-22 in FIG. 7. In addition, the step in which the user stops viewing the contents on the second client terminal 3-2 to the step in which the second contents server 2-2 sends the accounting information to the contents management server 1 (S3-25 to S3-34) are the same as steps S2-25 to S2-34 in FIG. 7. In processing method 2, the contents management server 1 sends the contents streaming stop request message to the second contents server 2-2 (S3-31) but, after that, does not send the contents storing stop request message to the first contents server 2-1 to store the contents even after the user stops viewing the contents. Therefore, the first contents server 2-1 continues streaming the contents to the first client terminal 3-1. Because the contents length is limited, the first contents server 2-1 stops streaming the contents to the first client terminal 3-1 when the end of the contents is reached (S3-37).

The first contents server 2-1 checks the contents processing method field of the contents storing request message received in step S3-13, finds that "processing method 2" is specified, and instructs the first client terminal 3-1 to stop storing the contents when the end of the contents is reached. Therefore, when the streaming of the contents is ended, the first contents server 2-1 sends the contents storing stop notification message to the first client terminal 3-1 (S3-40). The subsequent steps S3-40 to S3-46 are the same as steps S2-40 to S2-46 in FIG. 7.

Figure 9:
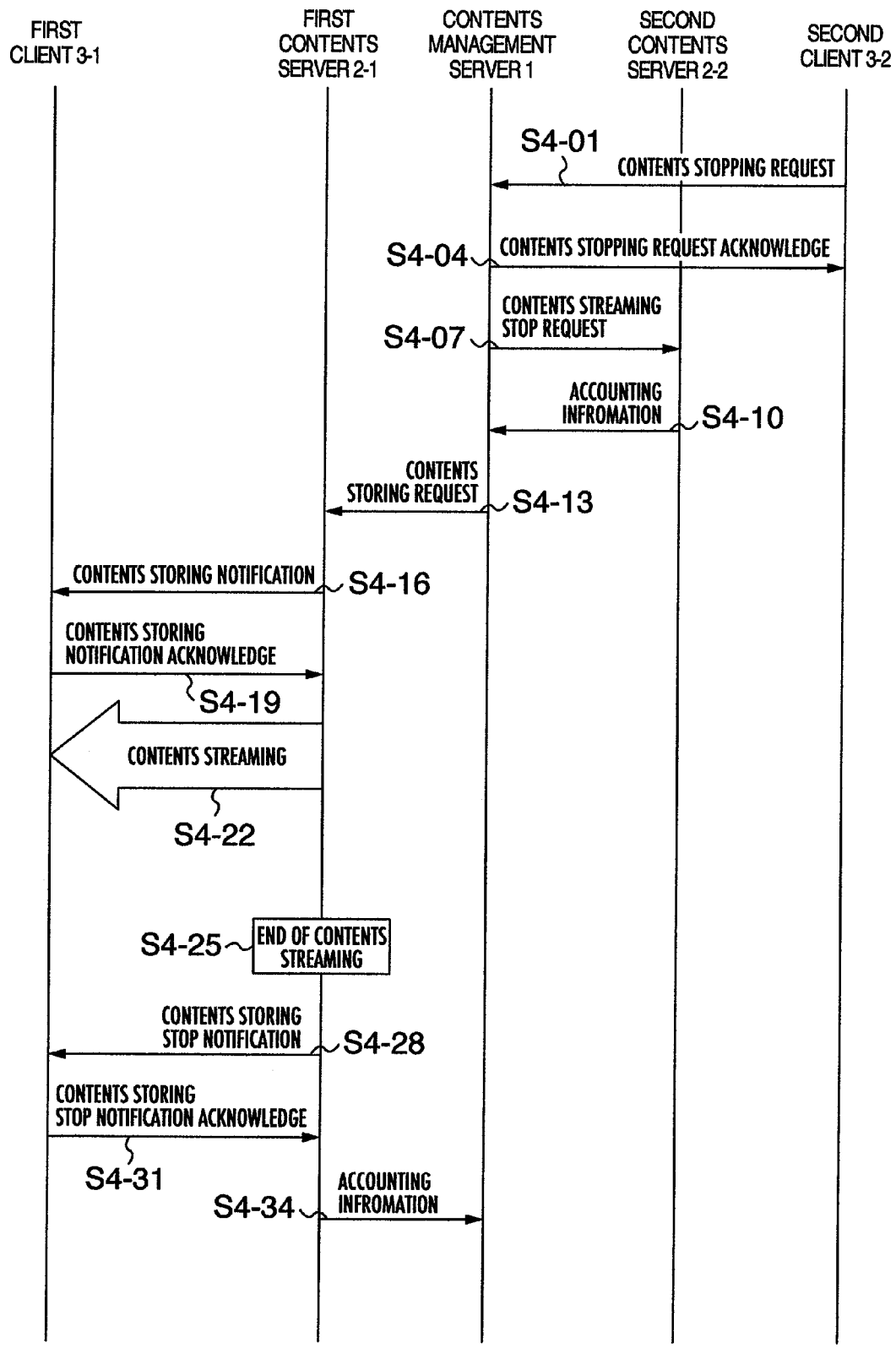
FIG. 9 is a timing diagram showing the processing when the client terminal acquires contents and the contents, from the time the user stops viewing to the end of contents streaming, are stored on another terminal.

Next, the following describes a case (processing method 3) in which the user stores the contents, from the time the user stops viewing to the end of the contents, on the other terminal with reference to FIG. 9. In this processing, the contents management server 1 does not perform special processing when the user starts viewing the contents on the second client terminal 3-2 but starts storing the contents when the user stops viewing the contents. The contents management server 1, which has received the contents stopping request message from the second client terminal 3-2 (S4-01), performs steps S4-01 to S4-10, which are the same steps as steps S2-25 to S2-34 in FIG. 7, to stop contents streaming to the second contents server 2-2 and to end the reception of the accounting information. In those steps, the contents management server 1 searches the client relation information table 1433 and finds that the processing to be performed for user account 1, which is related to user account 2, is to store the contents to the end of the contents. At the same time, the contents management server 1 sends the contents storing request message to the first contents server 2-1 (S4-13).

The contents management server 1 specifies processing method 3 in the contents processing method field of the contents storing request message. The first contents server 2-1, which has received the contents storing request message, sends the contents storing notification message, and streams the contents, to the first client terminal 3-1 (S4-16 to S4-22). This processing is the same as that performed in steps S2-16 to S2-22 in FIG. 7. After that, when the end of the contents streaming is reached, the first contents server 2-1 sends the contents storing stop notification message to the first client terminal 3-1 and sends the accounting information to the contents management server 1 (S4-25 to S4-34). This processing is the same as that performed in steps S3-37 to S3-46 in FIG. 8.

Figure 10:
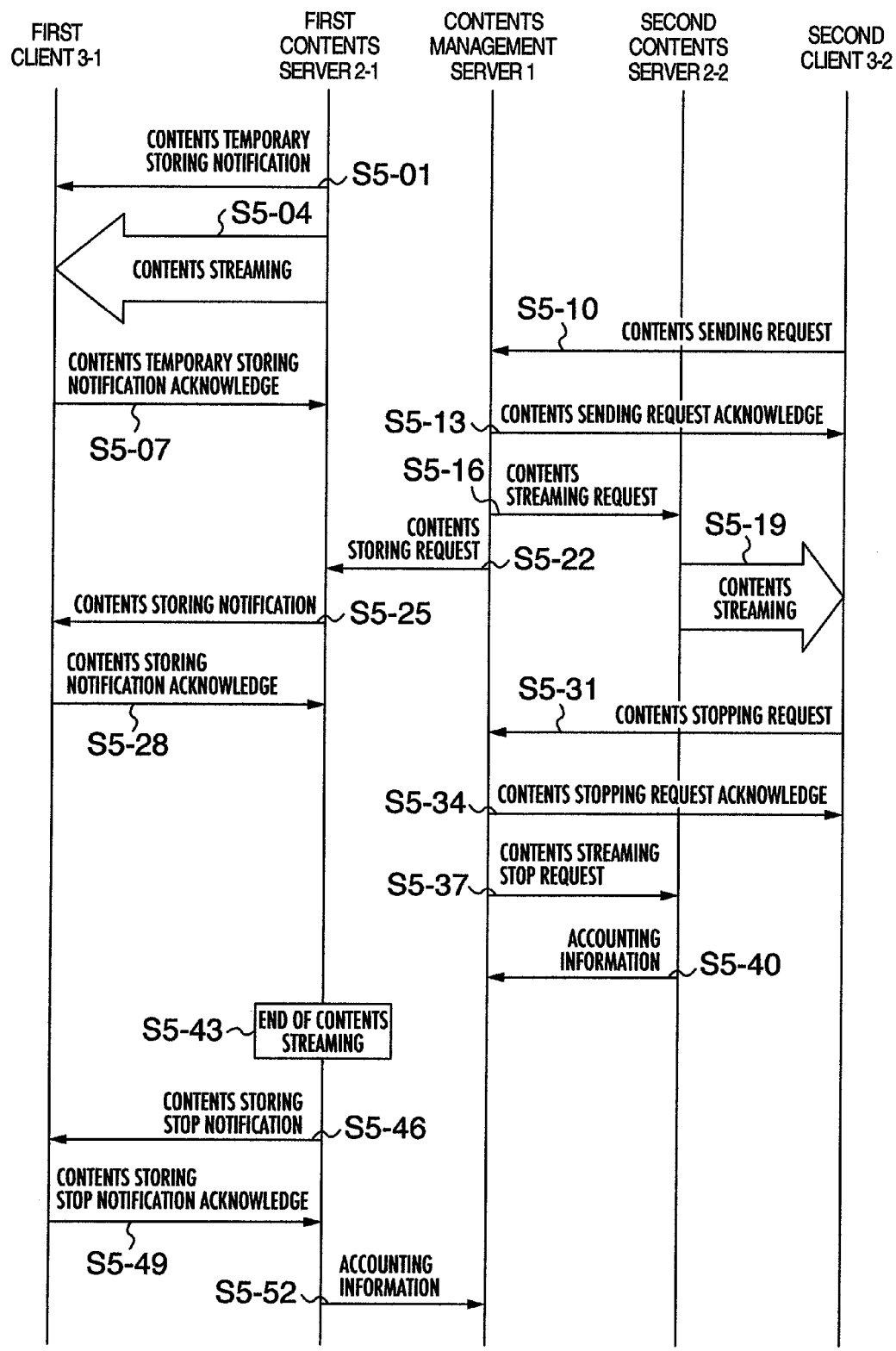
FIG. 10 is a timing diagram showing the processing when the client terminal acquires contents and all contents are stored on another terminal regardless of the start/end time of contents viewing.

Next, the following describes a case (processing method 4), in which all contents are stored on the other terminal when the user views the contents, with reference to FIG. 10. In this processing, all contents are stored on the client terminal regardless of when the user starts or stops viewing the contents. To implement this processing, the contents server must stream the contents to the client terminal regardless of whether or not the contents sending request message is sent. One method to satisfy this request is that the user specifies a list of broadcast channels, for which the user always wants to request to stream the contents, when the user makes the service contract. This information is managed by the channel identifier list in the user information table 2431 stored in the contents server 2. The contents, which are broadcast via a broadcast channel having the same identifier as that specified in the user information table 2431 in the contents server 2 as the identifier of the broadcast service channel available to the user, are streamed to the user regardless of the contents sending request from the user. Steps S5-01 and S5-04 indicate that broadcast contents are streamed to the first client terminal 3-1 that is controlled by the first contents server 2-1.

Upon receiving broadcast contents that satisfy the condition described above, the first contents server 2-1 sends a contents temporary storing notification message to the first client terminal 3-1 (S5-01) and, at the same time, starts streaming the contents (S5-04). Contents temporary storing is to store contents temporarily and, when the contents server 2 instructs to store the contents later, the storing of the contents is started, not from the time the contents storing request message is received, but from the time contents streaming was started. If the contents storing request message is not issued, the temporarily stored contents are deleted when the streaming of the contents is ended. PF-12 in FIG. 15 shows the format of the contents temporary storing notification message. Except the packet type, the contents temporary storing notification message PF-12 and the contents storing notification message PF-07 include the same information. The first client terminal 3-1, which has received the contents temporary storing notification message, sends the contents temporary storing notification acknowledge message to the first contents server 2-1 (S5-07).

As shown in FIG. 15, the contents temporary storing notification acknowledge message PF-13 and the contents storing notification acknowledge message PF-08 have the same information except the packet type. The response code indicates whether or not the processing is terminated successfully and, if the client terminal storage capacity is not sufficient, an error message is returned. In this example, assume that the user starts viewing contents on the second client terminal 3-2 via the steps similar to steps S2-01 to S2-13 in FIGS. 7 (S5-10 to S5-22). The contents storing request message, which is sent to the first contents server 2-1 in step S5-22, includes the contents identifier of the contents, currently received by the first client terminal 3-1, as the contents identifier and includes processing method 4 described above as the contents processing method. The contents storing request message specified in this way causes the first contents server 2-1 to instruct the first client terminal 3-1 to store contents received via the broadcast service (S5-25, 28).

If the contents specified by the contents management server 1 does not match the contents currently being broadcast, the first client terminal 3-1 ignores the contents storing request message received from the contents management server 1. After that, the second contents server 2-2 and the second client terminal 3-2 perform the same steps as steps S2-25 to S2-34 in FIG. 7 to stop the streaming of the contents based on the user request (S5-31 to S5-40). On the other hand, the first contents server 2-1 performs the same steps as steps S3-37 to S3-46 in FIG. 8 to stop the storing of the contents (steps S5-43 to S5-52). The contents stored in this processing are the contents received from the time the contents temporary storing notification message is received (S5-01) to the time the contents storing stop notification message is received (S5-46), that is, from the start time to the end time of the contents broadcast.

Figure 11:
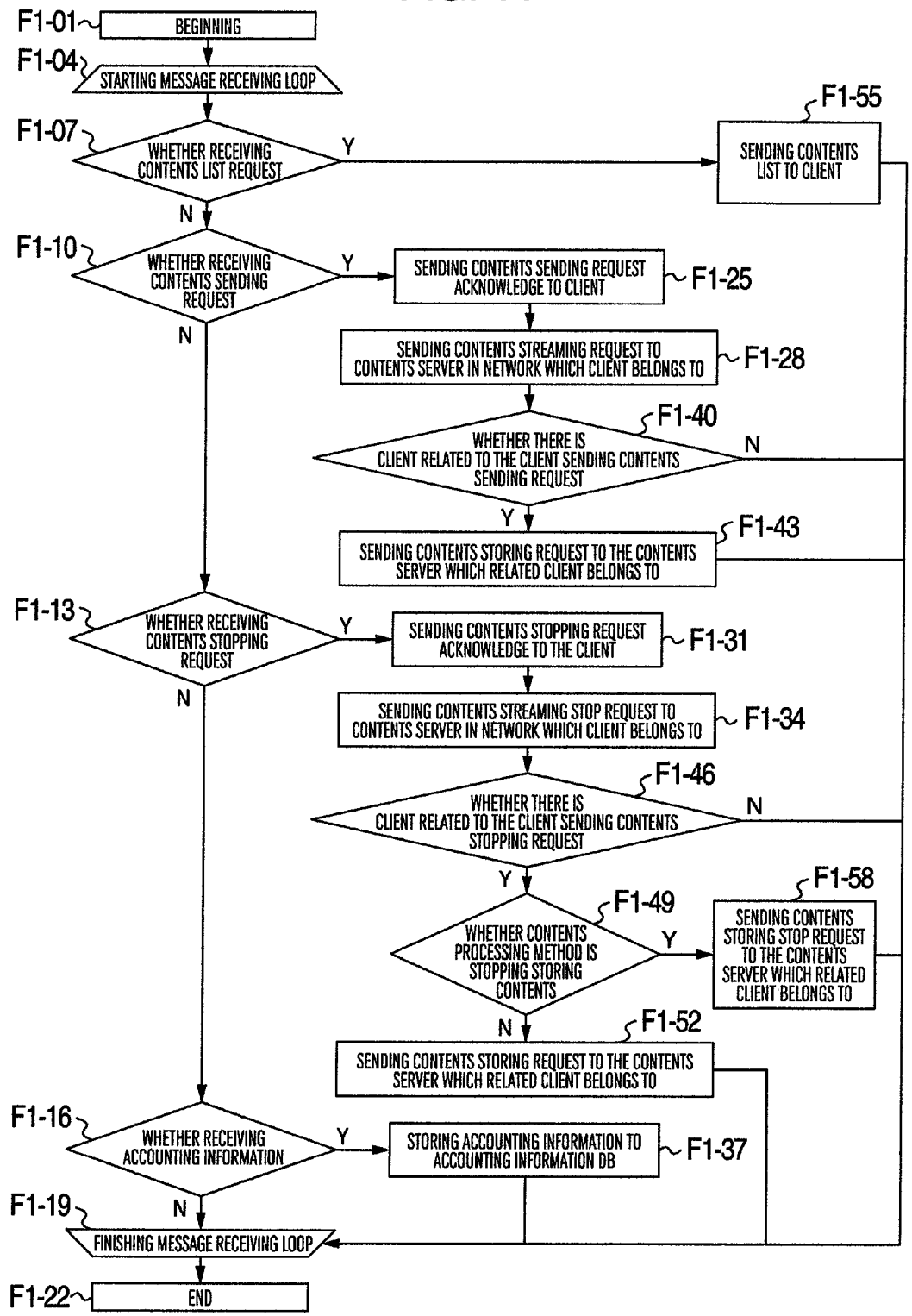
FIG. 11 is a flowchart showing an example of the control processing of the contents management server.

Next, the following describes an example of the control processing performed by the contents management server 1 with reference to the flowchart shown in FIG. 11. This flowchart is executed at a scheduled interval. The contents management server 1, when started (step F1-01), starts the message reception cycle (step F1-04) to receive messages from the network 4 (4-1 to 4-N). In step F1-07, the contents management server 1 checks if the received message is a contents list request message from the client terminal 3. If the received message is a contents list request message, control is passed to step F1-55 to send the contents list message to the client terminal 3 (S1-01 and S1-04 in FIG. 6).

On the other hand, if the received message is not a contents list request message, control is passed to step F1-10 to check if the received message is a contents sending request message from the client terminal 3. If the received message is a contents sending request message, control is passed to step F1-25 and the contents management server 1 sends the contents sending request acknowledge message to the client terminal 3 and, in step F1-28, sends the contents streaming request message to the contents server 2 that manages the network to which the client terminal 3 belongs (S2-01 to S2-07 in FIG. 7). In step F1-40, the contents management server 1 searches the client relation information table 1433 to check if there is another client terminal (for example, first client terminal 3-1) related to the client terminal 3 from which the contents sending request message was sent. If there is a related client terminal, control is passed to step F1-43 and the contents management server 1 sends the contents storing request message to the contents server of the network to which the related terminal belongs (S2-13 in FIG. 7).

If the received message is not a contents sending request message, control is passed to step F1-13 to check if the message is a contents stopping request message. If the message is a contents stopping request message, the contents management server 1 sends the contents stopping request acknowledge message to the client terminal 3 in step F1-31 and, in step F1-34, the contents streaming stop request message to the contents server 2 that manages the network 4 to which the client terminal 3 belongs (S2-25 to S2-31 in FIG. 7). In step F1-46, the contents management server 1 checks if there is another client terminal related to the client terminal 3 that has sent the contents stopping request message. If there is a related client terminal, the contents management server 1 checks in step F1-49 if the processing for the related terminal is to send the contents storing stop request. If the result is "YES", the contents management server 1 sends the contents storing stop request message to the contents server 2 corresponding to the client terminal 3 in step F1-58 (S2-37 in FIG. 7).

If the result is "NO", the processing for the client terminal is the start of contents storing (S4-13 in FIG. 9) and, in this case, control is passed to step F1-52 to send the contents storing request message to the corresponding contents server 2. In step F1-16, the contents management server 1 checks if the received message is an accounting information message and, if the received message is an accounting information message, the contents management server 1 stores the accounting information, included in the message, in the accounting information table 1451 (S2-34 in FIG. 7). The message reception cycle is finished (step F1-19) when the power of the contents management server 1 is turned off (step F1-22). By performing the processing described above, the contents management server 1 controls the streaming of contents by the contents server 2 to the client terminal 3 based on a request from the client terminal 3 and controls the contents storing processing for the related client terminal 3.

Figure 12:
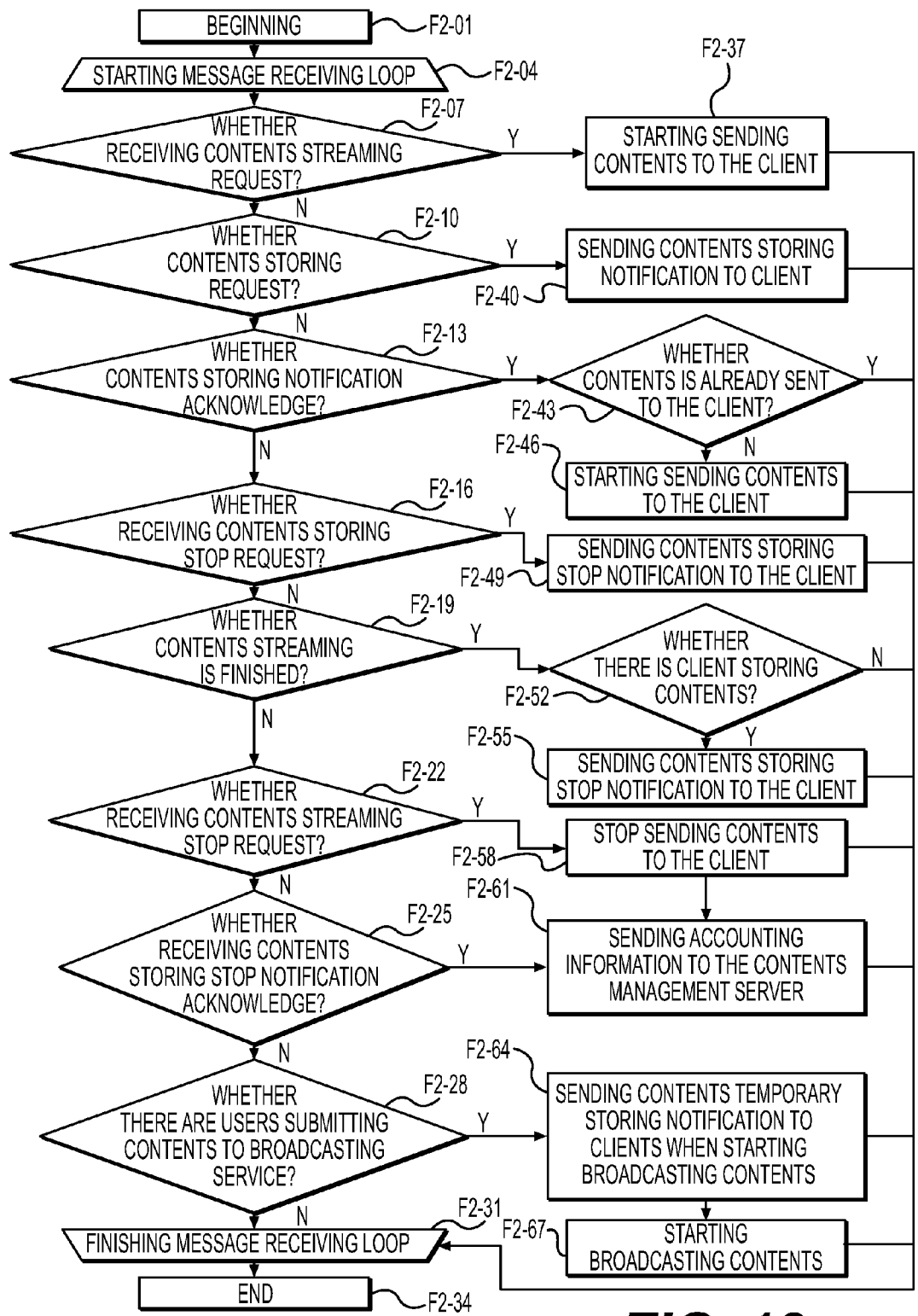
FIG. 12 is a flowchart showing an example of the control processing of the contents server.

Next, the following describes an example of the control processing performed by the contents server 2 with reference to the flowchart shown in FIG. 12. This flowchart is executed at a scheduled interval. The contents server 2, when started (step F2-01), starts the message reception cycle (step F2-04) to receive messages from the network 4. In step F2-07, the contents server 2 checks if the received message is a contents streaming request message from the contents management server 1 and, if the received message is the contents streaming request message, control is passed to step F2-37 and the contents server 2 starts streaming the contents to the client terminal 3 (S2-07, S2-10 in FIG. 7).

If the received message is not a contents streaming request message, control is passed to step F2-10 and the contents server 2 checks if the received message is a contents storing request message from the contents management server 1. If the received message is a contents storing request message, the contents server 2 sends the contents storing notification message to the client terminal 3 in step F2-40 (S2-13, S2-16 in FIG. 7). On the other hand, if the received message is not a contents storing request message, control is passed to step F2-13 and the contents server 2 checks if the received message is a contents storing notification acknowledge message. If the received message is a contents storing notification acknowledge message, control is passed to step F2-43 and the contents server 2 checks if the contents are already streamed to the client terminal 3. If the contents are not yet streamed, control is passed to step F2-46 and the contents server 2 starts streaming the contents that are requested to be stored (S2-22 in FIG. 7).

If the received message is not a contents storing notification acknowledge message, control is passed to step F2-16 and the contents server 2 checks if the received message is a contents storing stop request message. If the result is "YES", control is passed to step F2-49 and the contents server 2 sends the contents storing stop notification message to the client terminal 3 (S2-40 in FIG. 7). If the received message is not a contents storing stop request message in step F2-16 described above, control is passed to step F2-19 and the contents server 2 checks if the streaming contents indicates that the streaming is finished. If the streaming contents indicate that the contents streaming is finished, control is passed to step F2-52 and the contents server 2 checks if there is a client terminal 3 on which the finished streaming contents are to be stored. If there is a corresponding client terminal, control is passed to step F2-55 and the contents server 2 sends a contents storing stop notification message to the client terminal 3 (S3-37, S3-40 in FIG. 8).

If there are no contents that satisfy the condition in step F2-19, control is passed to step F2-22 and the contents server 2 checks if the received message is a contents streaming stop request message from the contents management server 1. If the received message is a contents streaming stop request message, control is passed to step F2-58 and the contents server 2 stops the streaming of the corresponding contents based on the request and, after that, sends the accounting information to the contents management server 1 in step F2-61 (S2-31 and S2-34 in FIG. 7). If the message received in step F2-22 is not a contents streaming stop request message, control is passed to step F2-25 and the contents server 2 checks if the received message is a contents storing stop notification acknowledge message form the client terminal. If the result is YES, the contents server 2 performs the processing described above in step F2-61 (S3-46 in FIG. 8).

If the received message is none of the above, the contents server 2 checks in step F2-28 if there are users submitting contents to the broadcasting service. If there are users submitting contents to the broadcasting service, the contents server 2 sends the contents temporary storing request notification message to the client terminals 3 of the users (step F2-64) to store the contents from the contents broadcast start time and, in step F2-67, starts streaming the corresponding contents (S5-01, S5-04 in FIG. 10). The message reception cycle is finished (step F2-31) when the power of the contents server 2 is turned off (step F2-34). By performing the processing described above, the contents server 2 instructs the contents streaming processing and the contents storing processing for the client terminal 3 and provides the broadcast service.

Figure 13:
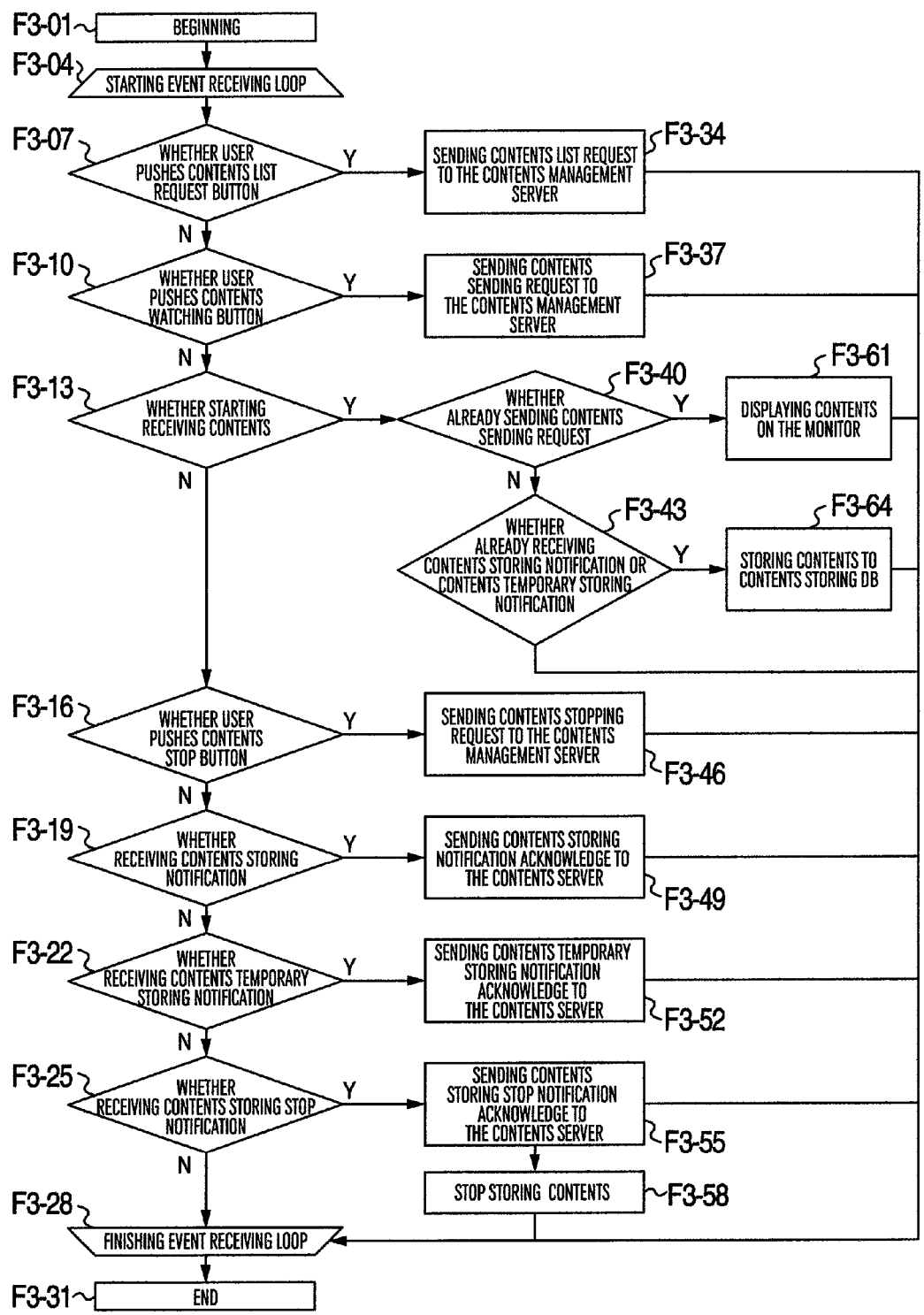
FIG. 13 is a flowchart showing an example of the control processing of the client terminal.

Next, the following describes an example of the control processing performed by the client terminal 3 with reference to the flowchart shown in FIG. 13. This flowchart is executed at a scheduled interval. The client terminal 3, when started (step F3-01), starts the event reception cycle (step F3-04) to receive a program internal event generated by a message from the network 4 or a user operation. In step F3-07, the client terminal 3 checks if the user pushes the Contents List Request button provided on the client terminal. If the user pushes the Contents List Request button, control is passed to step F3-34 and the client terminal 3 sends the contents list request message to the contents management server 1 (S1-01 in FIG. 6). If the event detected in step F3-07 is not generated by pushing the Contents List Request button, control is passed to step F3-10 and the client terminal 3 detects if the detected event is generated by pushing the Contents Watching button. If the event is generated by pushing the Contents Watching button, control is passed to step F3-37 and the client terminal 3 sends the contents sending request message to the contents management server 1 (S1-07 in FIG. 6).

If the detected event is not generated by pushing the Contents Watching button, control is passed to step F3-13 and the client terminal 3 checks if the reception of contents is started. If the reception of contents is started, control is passed to step F3-40 and the client terminal 3 checks if the contents sending request message is sent to the contents management server 1 in advance. If the contents sending request message is already sent, control is passed to step F3-61 and the client terminal 3 displays the received contents on the screen. If the message is not yet sent, control is passed to step F3-43 and the client terminal 3 checks if the contents storing notification message or the contents temporary storing notification message is received from the contents management server 1. If the message is already received, control is passed to step F3-64 and the client terminal 3 stores the received contents in the contents storing DB 341 (S2-22 in FIG. 7). If the message is not yet received, the broadcast service is received without viewers and no processing is performed. If a contents reception start event is not detected in step F3-13, control is passed to step F3-16 and the client terminal 3 checks if the event is generated by pushing the Contents Stop button. If the event is generated by pushing the Contents Stop button, control is passed to step F3-46 and the client terminal 3 sends the contents stopping request message to the contents management server 1 (S2-25 in FIG. 7).

If the detected event is not generated by pushing the Contents Stop button, the client terminal 3 checks in step F3-19 if the contents storing notification message is received. If the message is received, control is passed to step F3-49 and the client terminal 3 sends the contents storing notification acknowledge message to the contents server 2 (S2-19 in FIG. 7). If the event detected in step F3-19 is not generated by receiving the contents storing notification message, control is passed to step F3-22 and the client terminal 3 checks if the contents temporary storing notification message is received. If the message is received, control is passed to step F3-52 and the client terminal 3 sends the contents temporary storing notification acknowledge message to the contents server 2 (S5-07 in FIG. 10). If the event detected in step F3-22 is not generated by receiving the contents temporary storing notification message, control is passed to step F3-25 and the client terminal 3 checks if the contents storing stop notification message is received from the contents server 2. If the message is received, the client terminal 3 sends the contents storing stop notification acknowledge message to the contents server 2 in step F3-55 and, in step F3-58, stops the storing of the contents (S2-43 in FIG. 7). The message reception cycle is finished (step F3-28) when the power of the client terminal 3 is turned off (step F3-31). By performing the above processing, the client terminal 3 receives and displays contents based on the request from the user and stores contents based on the instruction from the contents server 2.

As described above, the contents management system of the present invention controls the streaming of contents, and automatically stores contents on another client terminal related to the client terminal on which the user views the contents, via the contents management server, contents server, and client terminal. Therefore, this contents management system can be applied to the streaming/storing service of contents on multiple networks including fixed networks such as a PON(Passive Optical Network) and mobile communication networks such as a mobile phone network.

It should be further understood by those skilled in the art that although the foregoing description has been made of embodiments of the invention, the invention is not limited thereto and various changes and modifications may be made without departing from the spirit of the invention and the scope of the appended claims.

The invention claimed is:

1. A contents management server comprising:

a network interface, connected to a plurality of networks having different network identifiers, for communicating with client terminals via said respective networks and communicating with a plurality of contents servers via said respective networks;

a contents information database that indicates a correspondence among a contents identifier that identifies contents, a channel identifier that identifies a broadcast channel of the contents, an address of the contents server that stores the contents, and a network identifier that identifies a network to which said contents server is connected;

a control unit that, when said network interface receives a contents sending request message from a client terminal, said contents sending request message including a contents identifier, a channel identifier, and a network identifier of the network to which the client terminal is connected, references said contents information database for determining an address of a contents server connected to the network identified by the received network identifier, generates a contents streaming request message that requests to deliver contents identified by the received contents identifier and the received channel identifier, to said client terminal, and controls said network interface so that the contents streaming request message is sent to said determined address of said contents server; and a user information database that indicates a correspondence between a network identifier of each user and a user account, a correspondence between a first user account of each user and a second user account related to the first user account, and information specifying an operation for a second client terminal belonging to a network having a second network identifier, wherein:

said network interface receives the contents sending request information, which includes a contents identifier, a channel identifier, and a first user account, from a first client terminal, and said control unit references said user information database, based on the first user account included in the contents sending request message received from said network interface, for determining a second network identifier and a second user account corresponding to the first user account, references said contents information database for determining an address of a second contents server corresponding to the second network identifier, generates the contents storing request message, including the contents identifier and the channel identifier included in the contents sending request message and the second user account based on information specifying an operation for the second terminal stored in said user information database, and controls said network interface so that the contents storing request message is sent to said second contents server.

2. The contents management server according to claim 1 wherein when said network interface receives a contents sending request message from a first client terminal belonging to a network having a first network identifier, said control unit generates a contents storing request message, which requests a second client terminal owned by said first client terminal and belonging to a network having a second network identifier, to store the contents and controls said network interface so that the contents storing request message is sent to a second contents server belonging to a network having the second network identifier.

3. The contents management server according to claim 1, further comprising:

an accounting information database that stores, for each user, a correspondence between a user account of the user in each network and accounting information on the user account, wherein:

said network interface receives an accounting information message, including accounting information based on contents viewing by the first user, from a contents server corresponding to the first network identifier and receives a second accounting information message, including accounting information based on contents stored by the second user account, from said second contents server, and said control unit stores the first and second accounting information in said accounting information database.

4. The contents management server according to claim 1, wherein:

said user information database further includes a correspondence between the first user account of each user and a contents processing method for a client terminal determined by the second user account, and said control unit further controls a time at which the contents storing request message is sent to said second contents server based on the contents processing method.

5. A contents streaming method performed in a management server connected to a plurality of networks having different network identifiers, each of the networks connecting to at least one contents server and at least one client terminal, for streaming contents from the contents server to the client terminal of a user via the network, said contents streaming method comprising the steps of:

receiving a contents sending request message from the client terminal, said contents sending request message including a network identifier of a network to which said client terminal is connected and a contents identifier;

referencing a contents information database for determining an address of a contents server connected to the network identified by the network identifier in the received contents sending request message, said contents information database indicating a correspondence among the network identifier and an address of a contents server connected to each network;

generating a contents streaming request message requesting to deliver contents identified by the received contents identifier, to said client terminal; and sending the contents streaming request message to the contents server determined by the determined address, wherein the contents sending request message, which includes a contents identifier and a first user account, is received from a first client terminal, further comprising the steps of:

referencing a user information database, which indicates a correspondence between a network identifier of each user and a user account, a correspondence between a first user account of each user and a second user account related to the first user account, and information specifying an operation for a second client terminal, for determining a second network identifier and a second user account corresponding to the first user account based on the first user account included in the contents sending request message;

referencing said contents information database for determining an address of a second contents server corresponding to the second network identifier;

generating a contents storing request message, which includes the contents identifier and the channel identifier included in the contents sending request message and the second user account, based on the information stored in said user information database and specifying an operation for the second client terminal; and sending the contents storing request message to the second contents server.

6. The contents streaming method according to claim 5 wherein the contents sending request message is received from a first client terminal belonging to a network having a first network identifier, further comprising the steps of:

generating a contents storing request message requesting to store the contents on a second client terminal that is owned by the same user as a user of the first client terminal and that belongs to a network having a second network identifier; and sending the contents storing request message to the contents server.

7. The contents streaming method according to claim 5, further comprising the steps of:

receiving an accounting information message, which includes accounting information based on contents viewing by the first user account, from the contents server corresponding to the first network identifier and a second accounting information message, which includes accounting information based on contents storing by the second user account, from said second contents server; and storing the first and second accounting information in an accounting information database that establishes a correspondence between a user account of the user on each network and accounting information on the user account.

8. The contents streaming method according to claim 5, wherein said user information database further includes a contents processing method for the client terminal, said contents processing method being established by a correspondence between the first user account and the second user account of each user, said contents streaming method further comprising the step of:

controlling a time at which the contents storing request message is sent to said second contents server based on the contents processing method.

9. A contents management system comprising a contents management server, a plurality of contents servers respectively connected to different networks, and a plurality of client terminals wherein said contents management server comprises:

a contents management server network interface, connected to a plurality of networks having different network identifiers, for communicating with client terminals via said respective networks and communicating with said contents servers via said respective networks;

a contents management server contents information database that indicates a correspondence among a contents identifier that identifies contents, a channel identifier that identifies a broadcast channel of the contents, an address of a contents server that stores the contents, and a network identifier that identifies a network to which said contents server is connected; and a control unit that, when said contents management server network interface receives a contents sending request message, which includes a contents identifier, a channel identifier, and a network identifier of the network to which a client terminal connected, from the client terminal, references said contents information database for determining an address of a contents server connected to the network identified by the network identifier in the received contents sending request message, generates a contents streaming request message that requests to deliver contents, determined by the contents identifier and the channel identifier, to said client terminal, and controls said network interface so that the contents streaming request message is sent to said determined contents server, said contents server comprises:

a contents server network interface that communicates with said contents management server and said client terminal via a network;

a contents server contents information database that indicates a correspondence among a contents identifier that identifies contents, the contents, and a channel identifier for contents broadcast services; and a control unit that, when said contents server network interface receives a contents streaming request message, which includes a contents identifier, a channel identifier, and a user account, from the contents management server, references said contents information database, and controls said contents server network interface so that contents, identified by the contents identifier, are delivered to said client terminal and a client terminal comprises:

a client terminal network interface that communicates with said contents management server and said contents server via a network;

a client terminal contents storing database that indicates a correspondence among a contents identifier that identifies contents, a channel identifier that identifies a broadcast channel for the contents, and the contents; and a control unit that controls said client terminal network interface so that, when starting contents viewing, said client terminal network interface sends a contents sending request message to said contents management server, said contents sending request message including a contents identifier, a channel identifier, and a network identifier of said one network, the system further comprising:

a user information database that indicates a correspondence between a network identifier of each user and a user account, a correspondence between a first user account of each user and a second user account related to the first user account, and information specifying an operation for a second client terminal belonging to a network having a second network identifier, wherein:

said network interface receives the contents sending request information, which includes a contents identifier, a channel identifier, and a first user account, from a first client terminal, and said control unit references said user information database, based on the first user account included in the contents sending request message received from said network interface, for determining a second network identifier and a second user account corresponding to the first user account, references said contents information database for determining an address of a second contents server corresponding to the second network identifier, generates the contents storing request message, including the contents identifier and the channel identifier included in the contents sending request message and the second user account based on information specifying an operation for the second terminal stored in said user information database, and controls said network interface so that the contents storing request message is sent to said second contents server.

* * * * *